US012024146B2

(12) United States Patent
Takahashi

(10) Patent No.: US 12,024,146 B2
(45) Date of Patent: Jul. 2, 2024

(54) IN-VEHICLE SYSTEM AND BRAKING SYSTEM FOR VEHICLE

(71) Applicant: TOYOTA JIDOSHA KABUSHIKI KAISHA, Toyota (JP)

(72) Inventor: Masataka Takahashi, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 17/685,731

(22) Filed: Mar. 3, 2022

(65) Prior Publication Data

US 2022/0314943 A1   Oct. 6, 2022

(30) Foreign Application Priority Data

Apr. 5, 2021   (JP) ................................. 2021-064067

(51) Int. Cl.
*B60T 8/171* (2006.01)
*B60T 8/175* (2006.01)

(52) U.S. Cl.
CPC .............. *B60T 8/171* (2013.01); *B60T 8/175* (2013.01); *B60T 2210/14* (2013.01); *B60T 2210/16* (2013.01); *B60T 2270/20* (2013.01)

(58) Field of Classification Search
CPC ...... B60T 8/171; B60T 8/175; B60T 2210/14; B60T 2210/16; B60T 2270/20
See application file for complete search history.

(56) References Cited

U.S. PATENT DOCUMENTS 6,301,540 B1   10/2001   Kato et al.

FOREIGN PATENT DOCUMENTS

| JP | 11-334568 A | 12/1999 |
| JP | 2011157038 A | * 8/2011 |
| JP | 6034378 B2 | 11/2016 |
| WO | 2013/004764 A1 | 1/2013 |

OTHER PUBLICATIONS

Machine Translation of JP2011157038A PDF File Name: "JP2011157038A_Machine_Translation.pdf".*

* cited by examiner

*Primary Examiner* — Grant Moubry
*Assistant Examiner* — Ruben Picon-Feliciano
(74) *Attorney, Agent, or Firm* — Sughrue Mion, PLLC

(57) ABSTRACT

A braking system for a vehicle, the braking system includes a brake provided in a wheel of the vehicle and configured to restrain rotation of the wheel, and a brake force control device configured to control a brake force of the brake. The brake force control device includes a road-surface condition acquisition portion configured to acquire a road-surface condition indicative of a condition of a road surface where the vehicle travels, and in a case where the road-surface condition acquisition portion acquires a plurality of conditions as the road-surface condition, the brake force control device controls the brake force in a mode different from respective controls on the brake force based on the conditions.

3 Claims, 4 Drawing Sheets

ROCKY AREA (Rock)

SAND AREA (Sand)

MUDDY AREA (Mud)

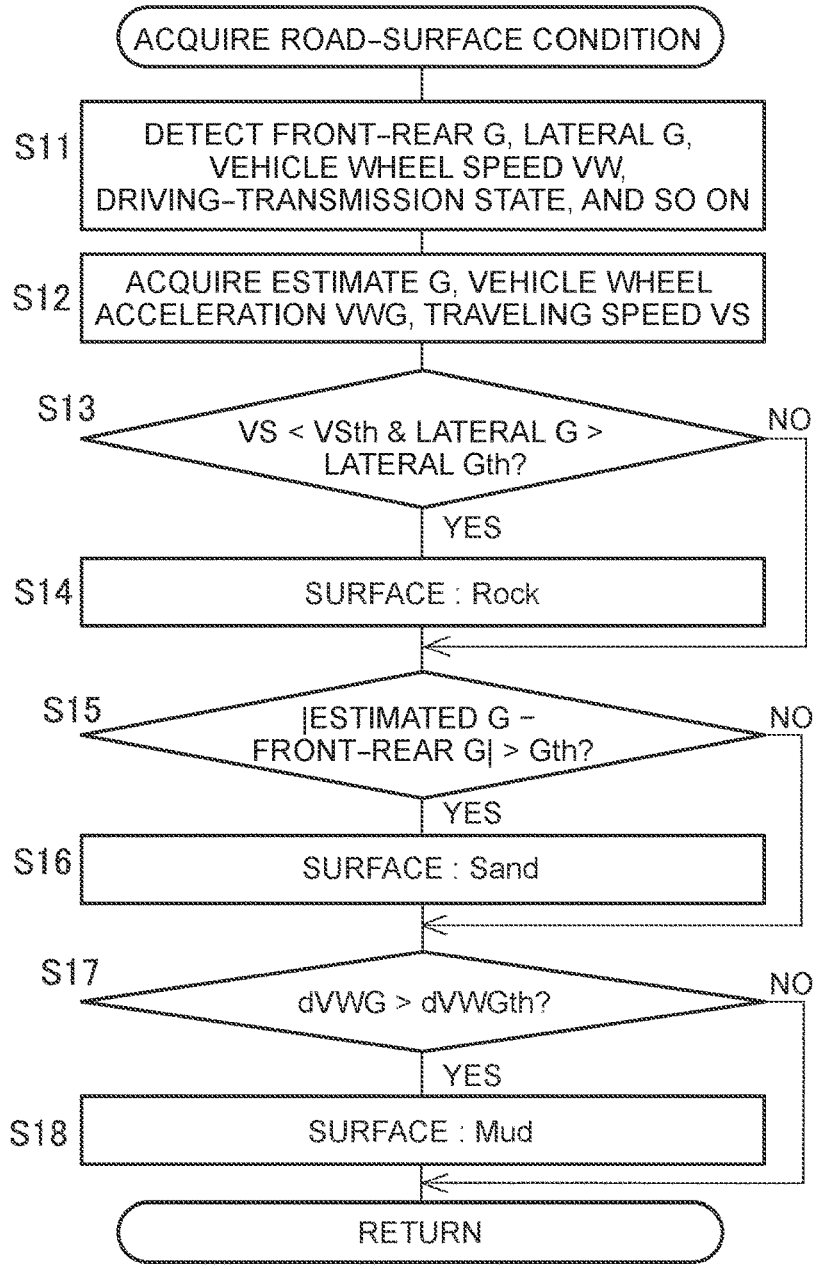

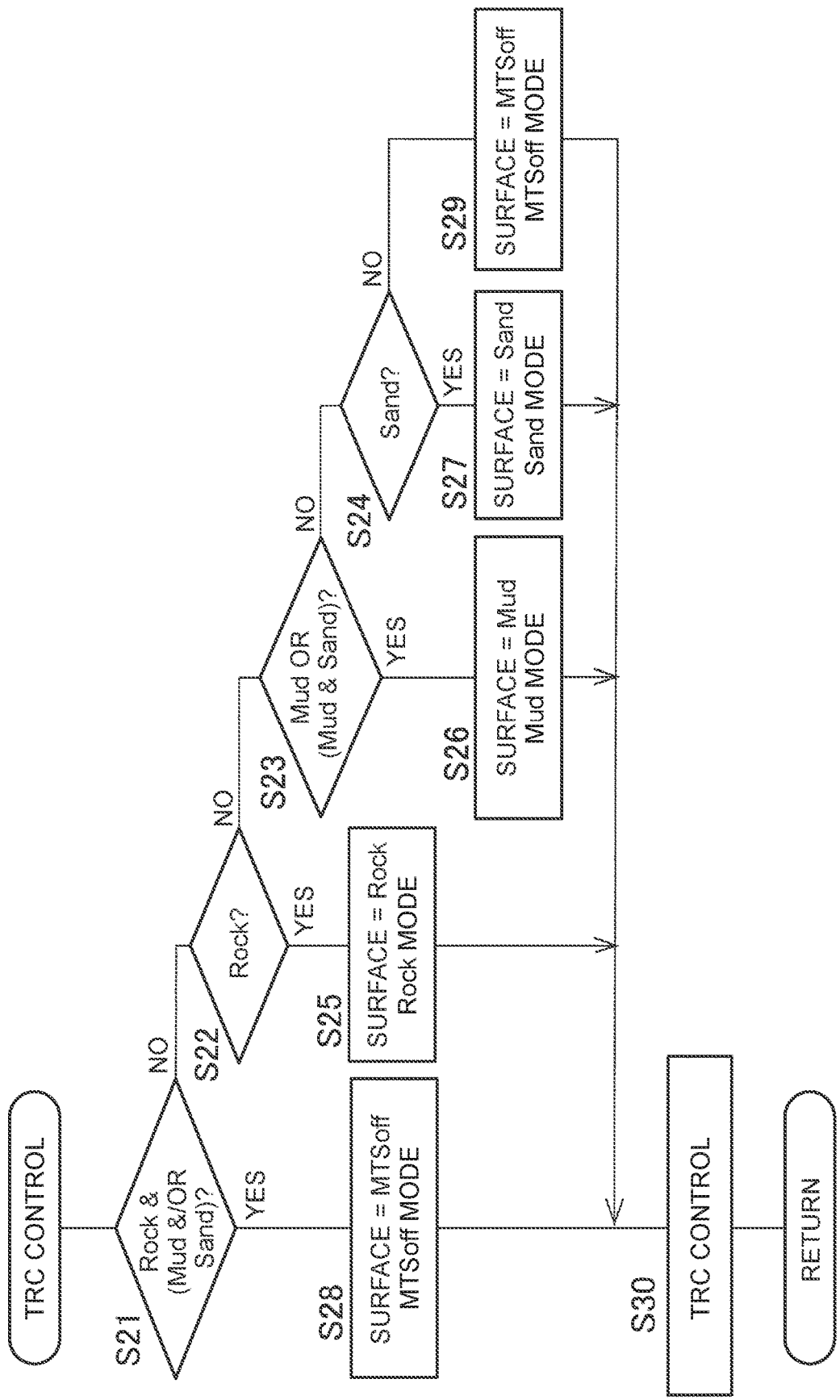

IN-VEHICLE SYSTEM AND BRAKING SYSTEM FOR VEHICLE

CROSS-REFERENCE TO RELATED APPLICATION

This application claims priority to Japanese Patent Application No. 2021-064067 filed on Apr. 5, 2021, incorporated herein by reference in its entirety.

BACKGROUND

1. Technical Field

The present disclosure relates to an in-vehicle system for controlling an in-vehicle device provided in a vehicle based on a road-surface condition.

2. Description of Related Art

Japanese Patent No. 6034378 (JP 6034378 B) describes an in-vehicle system for controlling an engine, a brake mechanism, a suspension, and so on based on a road-surface condition. In the in-vehicle system, a control mode for an engine or the like is determined to any one of a grass-gravel-snow control mode, a mud-rut control mode, a rock-boulder control mode, and so on based on the road-surface condition. The control mode is determined to a mode to be highly probably determined based on a plurality of parameters indicative of the road-surface condition. More specifically, as described in paragraphs [0058] to [0070] in JP 6034378 B, in a case where the vehicle speed is small, the road-surface condition is highly probably a rocky area. In view of this, in a case where the vehicle speed is small, the probability of the rock-boulder control mode is set to 0.7, and in a case where the vehicle speed is large, the probability of the rock-boulder control mode is set to 0.2. As such, the probability of each of the control modes is determined for each of the parameters, and complex probability values are acquired based on the probabilities. Then, a control mode with a highest complex probability value is determined as an optimum control mode based on the road-surface condition at that point.

SUMMARY

An object of the present disclosure is to provide an in-vehicle system that can restrain a remarkable decrease in startability of a vehicle.

In an in-vehicle system according to the present disclosure, in a case where a road-surface condition acquisition portion acquires a plurality of road-surface conditions, a control different from respective controls based on the road-surface conditions thus acquired is performed. This is because the condition or a road surface is more likely to be not accurately recognized by the road-surface condition acquisition portion. For example, in a case where a plurality of road-surface conditions is acquired and a control based on one road-surface condition from among the road-surface conditions is performed, when an actual road-surface condition is close to a road-surface condition different from the one road-surface condition from among the road-surface conditions, the startability of a vehicle may decrease remarkably. In the meantime, in a case where a control based on a road-surface condition different from any of the road-surface conditions (e.g., a control based on an intermediate road-surface condition between the road-surface conditions) or an intermediate control between respective controls based on the road-surface conditions is performed, even when the road-surface condition is close to any of the conditions, it is possible to restrain a remarkable decrease in the startability of the vehicle.

Note that runnability is a function that allows a vehicle to travel in accordance with the intention of a driver and a function that can restrain the vehicle from being stuck during traveling, for example. The startability is a function that can achieve successful start and a function that can restrain the vehicle from being stuck when the vehicle is driven, for example.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart illustrating a brake force control program stored in a brake ECU of the in-vehicle system;

FIG. 4 is a flowchart illustrating a part (S1) of the program; and

FIG. 5 is a flowchart illustrating a part (S2) of the program.

DETAILED DESCRIPTION OF EMBODIMENTS

One example of an in-vehicle system according to one embodiment of the present disclosure will be described in detail based on the drawings.

Figure 1:
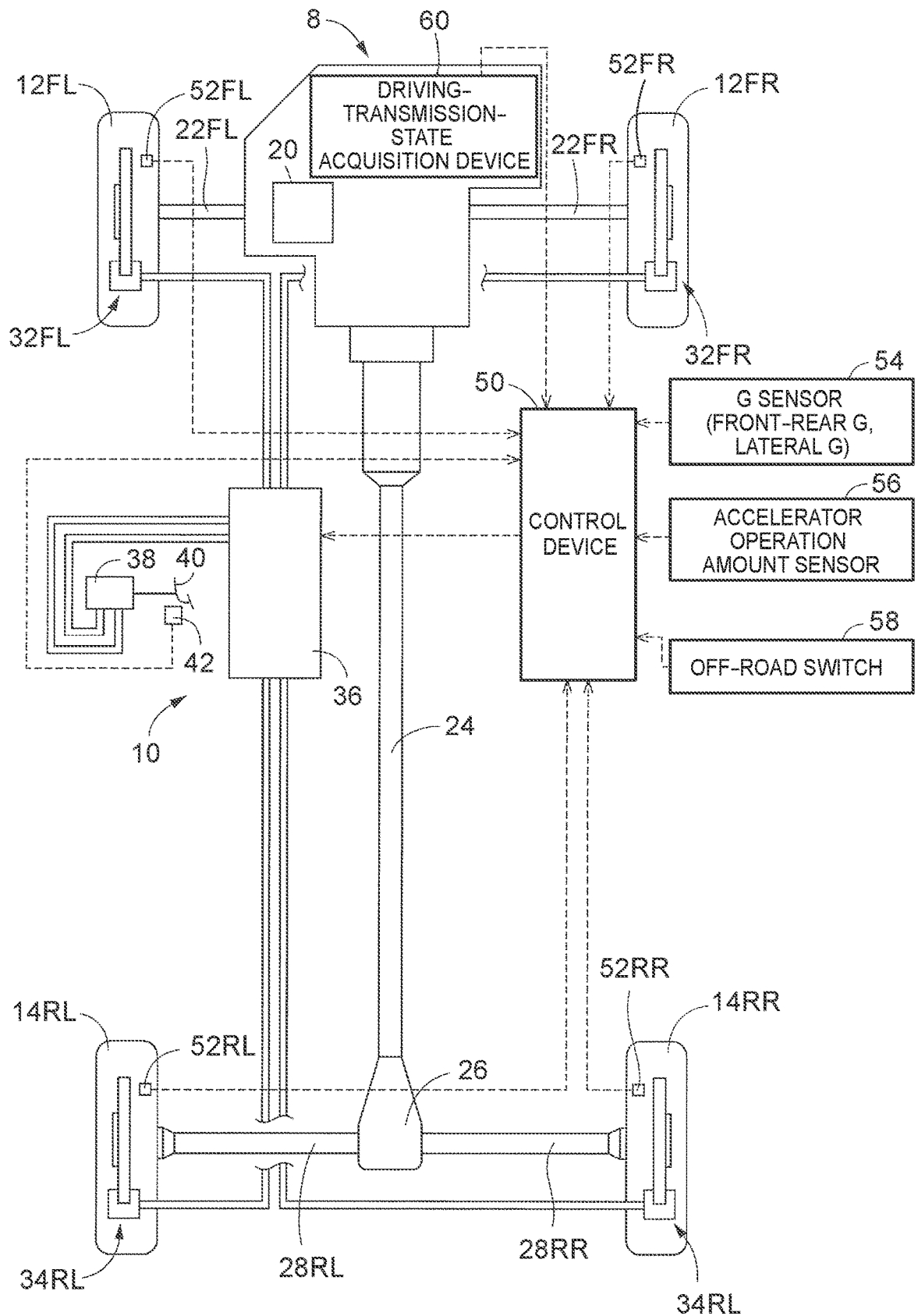
FIG. 1 is a plan view conceptually illustrating a structure of an in-vehicle system.

FIG. 1 illustrates one example of an in-vehicle system provided in a vehicle Vh. The vehicle Vh is a four-wheel drive vehicle in which right and left front wheels 12FR, 12FL and right and left rear wheels 14RR, 14RL are driving wheels. The in-vehicle system includes a driving-transmission device 8, a brake mechanism 10, and so on. The driving-transmission device 8 includes a driving device including at least either of an engine and an electric motor, a transmission, a transfer, and so on. An output from the driving-transmission device 8 is transmitted to the right and left front wheels 12FR, 12FL through a differential device 20 and drive shafts 22FR, 22FL and is also transmitted to the right and left rear wheels 14RR, 14RL through a propeller shaft 24, a differential device 26, and drive shafts 28RR, 28RL.

The differential device 20 divides an output torque from the driving-transmission device 8 into the right and left driving wheel 12FR, 12FL while a rotational speed difference between the right and left driving wheels 12FR, 12FL is permitted. When the rotation of one of the right and left driving wheels 12FR, 12FL is locked, the output torque to be applied from the driving-transmission device 8 to the other one of the right and left driving wheels 12FR, 12FL increases. This also applies to the differential device 26. The differential device 26 divides a rotating torque from the propeller shaft 24 into the right and left driving wheels 14RR, 14RL while a rotational speed difference between the right and left driving wheels 14RR, 14RL is permitted.

The brake mechanism 10 includes friction brakes 32FR, 32FL, 34RR, 34RL, a master cylinder 38, a brake actuator 36, and so on. The friction brakes 32FR, 32FL, 34RR, 34RL are brakes provided in the right and left front wheels 12FR, 12FL and the right and left rear wheels 14RR, 14RL, respectively, and configured to restrain the rotations of the wheels. The friction brakes 32FR, 32FL, 34RR, 34RL are each configured to restrain the rotation of the wheel by pressing a frictional engagement member against a brake rotating body rotatable together with the wheel due to hydraulic pressure, electromagnetic force, or the like. In the present embodiment, the friction brakes 32FR, 32FL, 34RR, 34RL can be operated by hydraulic pressure.

The master cylinder 38 generates hydraulic pressure due to the operation of a brake pedal 40 as a brake operating member. Further, whether the brake pedal 40 is operated or not is detected by a brake switch 42.

The brake actuator 36 is provided between the master cylinder 38 and the friction brakes 32, 34. The brake actuator 36 includes a power-assisted hydraulic pressure source such as a pumping device and a plurality of electromagnetic valves. Even in a case where the brake pedal 40 is not operated, hydraulic pressure can be generated by operation of the pumping device. Further, by controlling the electromagnetic valves, respective hydraulic pressures as pressing forces to the friction brakes 32FR, 32FL, 34RR, 34RL are individually controlled based on the hydraulic pressure of the master cylinder 38 or the hydraulic pressure generated by the pumping device.

Hereinafter, in a case where it is not necessary to distinguish the friction brakes or the like from each other based on wheel positions, that is, in a case where the friction brakes or the like are generally referred to, they are described without the reference sign FR, FL, RR, RL indicative of the wheel positions.

The in-vehicle system includes a control device 50 mainly constituted by a computer. The brake switch 42, wheel speed sensors 52FR, 52FL, 52RR, 52RL, an acceleration sensor (also referred to as a G sensor in the following description and also referred to as the G sensor in the drawings) 54, an accelerator operation amount sensor 56, an off-road switch 58, a driving-transmission-state acquisition device 60, and so on are connected to the control device 50, and the brake actuator 36 and so on are connected to the control device 50.

The wheel speed sensors 52 are provided in the wheels 12, 14, respectively, and detect respective rotation speeds of the wheels 12, 14 individually. The control device 50 acquires respective rotational accelerations of the wheels 12, 14 and a traveling speed of the vehicle Vh based on detection values from the wheel speed sensors 52. The G sensor 54 can be a gyro sensor, for example, and the G sensor 54 detects an acceleration in the front-rear direction of the vehicle Vh (also referred to as front-rear G) and an acceleration in the lateral direction (also referred to as lateral G). The accelerator operation amount sensor 56 is configured to detect an operation state of an accelerator pedal (not illustrated). In a case where a stepped amount of the accelerator pedal is large, an accelerator operation amount is larger than that in a case where the stepped amount is small.

The off-road switch 58 can be operated by a driver. When the off-road switch 58 is in an ON state, a brake force is permitted to be controlled based on the road-surface condition during traveling on an off-road. The driving-transmission-state acquisition device 60 detects an operational state of the driving-transmission device 8. For example, the driving-transmission-state acquisition device 60 detects a rotation number of the engine or detects a shift position of the transmission. The control device 50 acquires a driving force to be applied to the vehicle Vh based on the rotation number of the engine, the shift position of the transmission, and so on and estimates the front-rear G. The front-rear G thus estimated by the control device 50 is referred to as estimated front-rear G.

In the in-vehicle system configured as described above, in a case where the off-road switch 58 is in the ON state while the vehicle Vh is traveling on an off-road, the brake force is controlled based on the road-surface condition. The control device 50 acquires a road-surface condition of a place where the vehicle Vh travels, based on a traveling state of the vehicle Vh. The traveling state of the vehicle Vh can be represented by detection values from the wheel speed sensors 52, a detection value from the G sensor 54, an operational state of the driving-transmission device 8, or the like. The brake actuator 36 and so on are controlled based on the acquired road-surface condition. Hereinafter, in a case where the vehicle Vh travels on the off-road, the vehicle Vh may travel in a place that is not a road, and the ground of the place that is not a road is also referred to as a road surface conveniently.

Figure 2A:
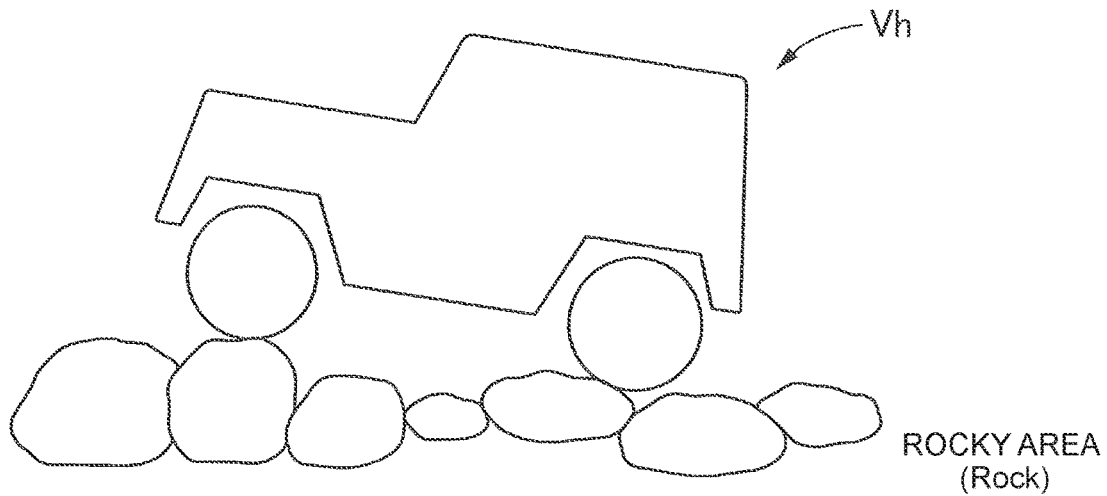
FIG. 2A is a view illustrating a state where a vehicle provided with the in-vehicle system travels and is a view illustrating a state where the vehicle travels in a rocky area.
Figure 2B:
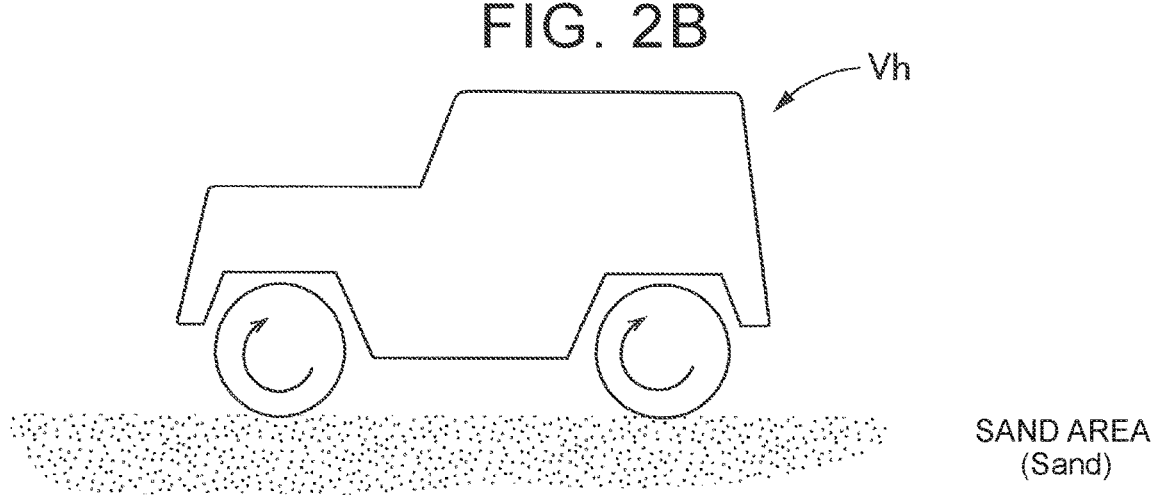
FIG. 2B is a view illustrating a state where the vehicle provided with the in-vehicle system travels and is a view illustrating a state where the vehicle travels in a sand area.
Figure 2C:
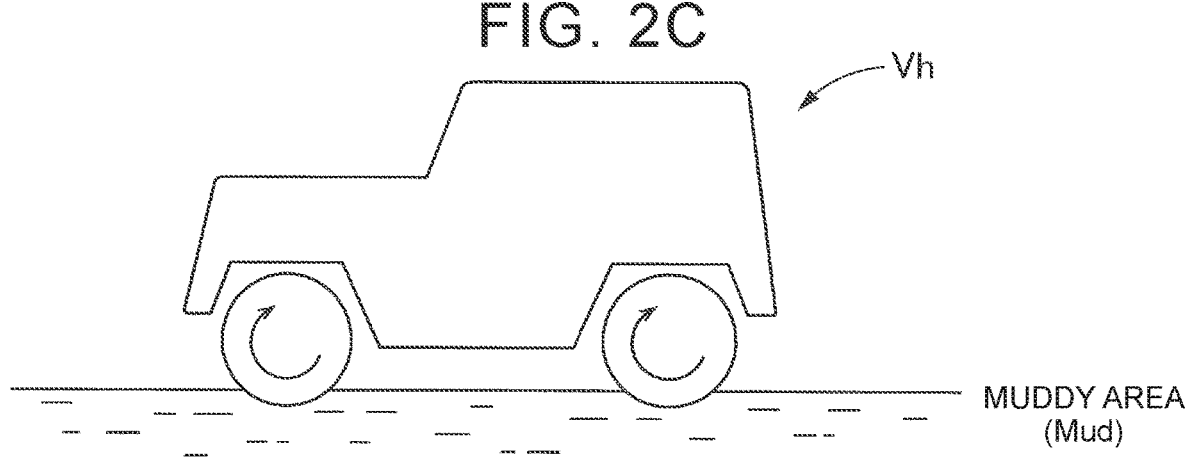
FIG. 2C is a view illustrating a state where the vehicle provided with the in-vehicle system travels and is a view illustrating a state where the vehicle travels in a muddy area.

For example, as illustrated in FIGS. 2A, 2B, 2C, the control device 50 determines which road-surface condition the place where the vehicle Vh travels belongs to, a rocky area (referred to as Rock in FIG. 2A), a muddy area (referred to as Mud in FIG. 2C), or a sand area (referred to as Sand in FIG. 2B).

As illustrated in FIG. 2A, the rocky area (Rock) is an area where rocks or large stones are present, for example. In the rocky area, it is difficult for the vehicle Vh to travel at a large traveling speed. Further, a vehicle body is easily inclined, and the lateral G easily increases. On that account, in a case where the traveling speed of the vehicle Vh is smaller than a setting speed and the lateral G is larger than setting lateral G, the road-surface condition is determined to belong to the rocky area. Note that, in a case where the vehicle Vh travels in the rocky area, the operation of the brake pedal 40 is frequently performed. Accordingly, that the brake switch 42 is in the ON state can be added to a condition based on which the road-surface condition is determined to belong to the rocky area.

As illustrated in FIG. 2B, the sand area (Sand) is an area with a lot of gravel. The gravel includes a lot of sand and a lot of small stones. In the sand area, the vehicle Vh easily skids, and actual front-rear G that is an actual front-rear acceleration easily becomes smaller than estimated front-rear G. On that account, in a case where a value obtained by subtracting the actual front-rear G from the estimated front-rear G is equal to or more than a setting value, the place where the vehicle Vh travels is determined to belong to the sand area. The estimated front-rear G is the front-rear G of the vehicle Vh that is estimated based on an operational state or the like of the driving-transmission device 8 that is detected by the driving-transmission-state acquisition device 60. The actual front-rear G is an actual acceleration of the vehicle Vh in the front-rear direction that is detected by the G sensor 54.

As illustrated in FIG. 2C, the muddy area (Mud) is mud. In the muddy area, it is normal that the degree of the mud is not uniform. Accordingly, the amplitudes of change in the rotational accelerations of the wheels 12, 14 of the vehicle Vh easily increase. On that account, in a case where the amplitudes of change in the wheel accelerations are equal to or more than a setting value, the road-surface condition is determined to belong to the muddy area.

Note that, when the small stones included in the sand area are compared with the rocks or stones included in the rocky area, the rocks or stones included in the rocky area are larger than the small stones included in the sand area. The rocks or stones included in the rocky area have magnitudes that cause the lateral G to be equal to or more than a setting value.

In the meantime, in a case where the vehicle Vh travels in the rocky area, for example, the rotational accelerations of the wheels 12, 14 when the wheels 12, 14 make contact with rocks may be greatly different from those when the wheels 12, 14 are distanced from rocks. In such a case, the road-surface condition may be determined to belong to the muddy area. Further, in a case where the muddy area is inclined, the traveling speed of the vehicle Vh may be small, so that the lateral G may be larger than setting lateral G. In such a case, the road-surface condition may be determined to belong to the rocky area. In these cases, the road-surface condition is determined to belong to the rocky area and the muddy area. Similarly, there is such a case that the road-surface condition is determined to belong to the rocky area and the sand area.

Further, in a case where the vehicle Vh travels in the muddy area, when the vehicle is stuck, the actual front-rear G may become smaller than the estimated front-rear G. In such a case, the road-surface condition may be determined to belong to the sand area. In this case, there is such a case that the road-surface condition is determined to belong to the muddy area and the sand area.

As a control on the brake force, a traction control is performed based on the acquired road-surface condition. In a state where the accelerator pedal (not illustrated) is stepped by a driver (the accelerator operation amount detected by the accelerator operation amount sensor 56 is larger than a setting operation amount), in a case where a drive skid reaches a setting state or more (e.g., a drive skid rate is equal to or more than a setting value), the traction control is performed. The drive skid is a skid of at least one of the wheels 12, 14. In the traction control, even in a case where the brake pedal 40 is not stepped, the friction brakes 32, 34 are operated by the brake actuator 36, so that brake forces are applied to the wheels 12, 14. Driving forces (driving torques) to be applied to the wheels 12, 14 are restrained, so that the drive skid is restrained.

In the traction control, in a case where the road-surface condition belongs to the rocky area, a large brake force is applied to a wheel with a large drive skid. For example, there is such a case that one of the right and left driving wheels (e.g., the left rear wheel 14RL) is distanced from a rock surface and spins. In that case, by strongly restraining the rotation of the spinning wheel (the left rear wheel 14RL), it is possible to increase a driving torque to be applied to the other one of the wheels (the right rear wheel 14RR). Hereby, it is possible to improve runnability or startability of the vehicle Vh in the rocky area. This control mode is referred to as a rock mode.

In the traction control, in a case where the road-surface condition belongs to the muddy area or the sand area, a brake force to be applied to the wheel with a large drive skid is smaller than a brake force to be applied thereto in a case where the road-surface condition belongs to the rocky area. The reason is as follows. That is, in the muddy area or the sand area, the drive skids of the wheels 12, 14 easily become large. However, the runnability or the startability can be improved by applying large driving forces to the wheels 12, 14 instead of restraining the drive skids. This control mode is referred to as a mud mode or a sand mode.

In the present embodiment, in a case where the road-surface condition is determined to belong to "the rocky area and the muddy area," in a case where the road-surface condition is determined to belong to "the rocky area and the sand area," or in a case where the road-surface condition is determined to belong to "the rocky area, the muddy area, and the sand area," the traction control is performed such that a brake force to be applied to a friction brake of the wheel with a large drive skid is controlled so that the brake force has an intermediate magnitude between a brake force to be applied in a case where the road-surface condition belongs to the rocky area and a brake force to be applied in a case where the road-surface condition belongs to the muddy area or the sand area. This is because, in a case where the road-surface condition is determined to belong to the rocky area and at least either one of the muddy area and the sand area, it is considered that the condition of a road surface is not accurately acquired. This control mode is referred to as an MTSoff mode.

Multi Terrain Select (MTS) means that whether the road-surface condition belongs to one of predetermined areas (the rocky area, the muddy area, and the sand area) or not is acquired or indicates a control to be performed on an in-vehicle device based on one area acquired from among the areas (the rocky area, the muddy area, and the sand area). In the meantime, in the present embodiment, in a case where the road-surface condition is determined to belong to "the rocky area and the muddy area," in a case where the road-surface condition is determined to belong to "the rocky area and the sand area," or in a case where the road-surface condition is determined to belong to "the rocky area, the muddy area, and the sand area," it can be considered that the road-surface condition belongs to an MTSoff condition or that MTS is turned off because a control based on any of "the rocky area, the muddy area, and the sand area" is not suitable.

Note that a control corresponding to the MTSoff mode can be considered as a control to be performed based on an MTSoff road-surface condition, that is, an intermediate road-surface condition between the rocky area and the muddy area or the sand area (or a road-surface condition that can be referred to as a condition different from any of the rocky area, the muddy area, and the sand area), a control corresponding to an intermediate control mode between the rock mode and the mud mode or the sand mode (or a control mode different from any of the rock mode, the mud mode, and the sand mode), or a control other than these controls. Further, in a case where a plurality of road-surface conditions is acquired, the road-surface condition can be considered as a road-surface condition that is not suitable for a so-called MTS control. That is, it can be considered that the MTSoff condition is acquired, and a control mode set based on the MTSoff road-surface condition thus acquired is the MTSoff mode.

In the meantime, in an in-vehicle system in the related art, in a case where a plurality of conditions including the rocky area (e.g., the rocky area and at least one of the muddy area and the sand area) is acquired as the road-surface condition, the rock mode in which a large brake force is applied is set from the viewpoint of safety. However, this causes such a problem that, in a case where the road-surface condition does not belong to the rocky area, the runnability and the startability of the vehicle Vh rather decrease. In the meantime, in the present embodiment, in a case where a plurality of conditions including the rocky area is acquired as the road-surface condition, the MTSoff mode that is an intermediate control mode between the rock mode and the mud mode or the sand mode is set. Hereby, even in a case where the road-surface condition does not belong to the rocky area, it is possible to restrain a remarkable decrease in the runnability or the startability of the vehicle Vh.

Note that, in the traction control, in a case where the accelerator operation amount detected by the accelerator operation amount sensor 56 is equal to or more than the setting operation amount and the vehicle running speed is equal to or less than the setting speed, the control on brake force is considered not to be suitable for the road-surface condition. On that account, in that case, even in a case where any of the rock mode, the mud mode, and the sand mode is set, the mode is switched to the MTSoff mode.

In the present embodiment, a brake force control program expressed by the flowchart of FIG. 3 is executed at every predetermined setting time. In Step 1 (hereinafter just referred to S1 and this will also apply to other steps), a road-surface condition is acquired, and in S2, the traction control as a control on brake force is performed based on the acquired road-surface condition.

The acquisition of the road-surface condition in S1 is performed in accordance with the flowchart of FIG. 4. In S11, front-rear G and lateral G are acquired by the G sensor 54, respective wheel speeds of the wheels 12, 14 are acquired by the wheel speed sensors 52, and an operational state or the like of the driving-transmission device 8 is acquired by the driving-transmission-state acquisition device 60. In S12, estimated front-rear G is acquired based on the operational state of the driving-transmission device 8, a traveling speed VS is acquired based on the wheel speeds of the wheels 12, 14, and respective rotational accelerations VWG of the wheels 12, 14 are acquired. In S13, it is determined whether the traveling speed VS is smaller than a setting speed VSth and the lateral G is larger than the setting lateral G or not. In a case where the determination in S13 is YES, the road-surface condition is determined to belong to the rocky area in S14. Subsequently, in S15, it is determined whether the absolute value of a value obtained by subtracting actual front-rear G from the estimated front-rear G is larger than a setting value Gth or not. In a case where the determination in S15 is YES, the road-surface condition is determined to belong to the sand area in S16. Subsequently, in S17, it is determined whether the amplitude of the rotational acceleration of at least one wheel out of the four wheels is larger than a setting value or not. In a case where the determination in S17 is YES, the road-surface condition is determined to belong to the muddy area in S18.

As such, in the present embodiment, in a case where each of the conditions of S13, 15, 17 is established, a corresponding one of the rocky area, the sand area, and the muddy area is acquired as the road-surface condition. Accordingly, there is such a case that two or more conditions from among the rocky area, the sand area, and the muddy area are acquired as the road-surface condition.

The control on brake force in S2 is determined in accordance with the flowchart of FIG. 4. In S21, it is determined whether or not the acquired road-surface condition belongs to a plurality of conditions including the rocky area (the rocky area & at least either one of the muddy area and the sand area), in other words, it is determined which condition the acquired road-surface condition belongs to, "the rocky area & the muddy area," "the rocky area & the sand area," or "the rocky area & the muddy area & the sand area." In S22, it is determined whether the road-surface condition belongs to the rocky area or not. In S23, it is determined whether or not the road-surface condition belongs to the muddy area or "the muddy area & the sand area." In S24, it is determined whether the road-surface condition belongs to the sand area or not.

In a case where the acquired road-surface condition belongs to the rocky area, the determination in S22 is YES. In S25, the rocky area is acquired as a control road-surface condition, so that the control mode is determined to belong to the rock mode.

In a case where the acquired road-surface condition belongs to the muddy area or "the muddy area & the sand area," the determination in S23 is YES. In S26, the muddy area is acquired as the control road-surface condition, so that the control mode is determined to belong to the mud mode. In a case where the road-surface condition belongs to "the muddy area and the sand area" as such, the mud mode that is a control mode based on the muddy area is set. This is because, when a case where a control based on the sand mode is performed in the muddy area is compared with a case where a control based on the mud mode is performed in the sand area, a decrease in the runnability and the startability is larger in the former case than in the latter case.

In a case where the acquired road-surface condition belongs to the sand area, the determination in S24 is YES. In S27, the sand area is acquired as the control road-surface condition, so that the control mode is determined to belong to the sand mode.

Further, in a case where the acquired road-surface condition belongs to a plurality of conditions including the rocky area (the rocky area & at least either one of the muddy area and the sand area), the determination in S21 is YES. In S28, the control road-surface condition is determined to belong to MTSoff, so that the control mode is determined to be the MTSoff mode. In a case where all the determinations in S21 to S24 are NO, the control road-surface condition is also determined to belong to MTSoff in S29, so that the control mode is determined to be the MTSoff mode.

Further, in S30, the traction control is performed based on the control mode determined in S25 to 29. In a case where the control mode is the rock mode, a large brake force is applied to a wheel with a large drive skid. In a case where the control mode is the mud mode or the sand mode, the brake force to be applied to the wheel with a large drive skid is smaller than that in a case where the rock mode is set. In the meantime, in a case where the control mode is the MTSoff mode, the brake force is controlled in an intermediate control mode between the rock mode and the mud mode or the sand mode. The brake force to be applied to the wheel with a large drive skid is controlled such that the brake force has an intermediate magnitude between a case where the rock mode is set and a case where the mud mode or the sand mode is set. That is, a brake force to be applied from a friction brake to a wheel with a drive skid equal to or more than a setting state is smaller than a brake force to be applied in a case where the rock mode is set but is larger than a brake force to be applied in a case where the mud mode or the sand mode is set. As a result, in a case where MTSoff is acquired as the road-surface condition, even when an actual road-surface condition is closer to the rocky area or even when the actual road-surface condition is closer to the muddy area or the sand area, it is possible to restrain a remarkable decrease in the runnability and the startability of the vehicle.

As described above, in the present embodiment, a brake force control device is constituted by a part of the control device 50 in which the brake force control program expressed by the flowchart of FIG. 3 is stored, a part of the control device 50 that executes the brake force control program, and so on. A road-surface condition acquisition portion is constituted by a part of the brake force control device in which S1 is stored, a part of the brake force control device that executes S1, and so on. A control road-surface condition determination portion and a control mode determination portion are constituted by a part of the brake force control device in which S25 to S29 are stored, a part of the brake force control device that executes S25 to S29, and so on.

Note that the above embodiment deals with a case where the brake mechanism 10 is controlled based on a road-surface condition. However, the present embodiment can be applied to a case where an in-vehicle device such as the driving-transmission device 8 or the suspension is controlled.

Further, in the above embodiment, the road-surface condition is acquired based on detection values or the like from the G sensor 54, the wheel speed sensors 52, the driving-transmission-state acquisition device 60, and so on. However, in addition to that, the road-surface condition can be acquired based on a detection value from a vehicle height sensor or an image or the like acquired based on an in-vehicle camera, a laser, or the like.

Further, the present disclosure can be carried out in various forms obtained by various changes or various modifications based on the knowledge of the person skilled in the art, in addition to the above embodiment.

(1) A braking system for a vehicle includes a brake and a brake force control device. The brake is provided in a wheel of the vehicle and configured to restrain rotation of the wheel. The brake force control device is configured to control a brake force of the brake. The brake force control device includes a road-surface condition acquisition portion configured to acquire a road-surface condition indicative of a condition of a road surface where the vehicle travels. In a case where the road-surface condition acquisition portion acquires a plurality of conditions as the road-surface condition, the brake force control device controls the brake force in a mode different from respective controls on the brake force based on the conditions.

For example, in a case where a plurality of conditions is acquired as the road-surface condition, the brake force can be controlled by an average strength among strengths of respective controls on the brake force based on the conditions.

The road-surface condition acquisition portion may be configured to acquire the road-surface condition based on the traveling state of the vehicle or may be configured to acquire the road-surface condition based on image data acquired from a camera or the like or information acquired by a radar or the like. For example, the road-surface condition can be acquired based on the traveling speed of the vehicle, a skid state of the wheel, or the like.

(2) In the braking system according to (1), the road-surface condition acquisition portion may be configured to acquire which condition the road-surface condition belongs to, a first condition or a second condition. In a case where the first condition and the second condition are acquired by the road-surface condition acquisition portion as the road-surface condition, the brake force control device may control the brake force in a mode different from a control on the brake force based on the first condition and a control on the brake force based on the second condition.

(3) In the braking system according to (2), in a case where the road-surface condition acquired by the road-surface condition acquisition portion belongs to the first condition, the brake force control device may control the brake force such that the brake force is stronger than a brake force to be applied in a case where the road-surface condition acquired by the road-surface condition acquisition portion belongs to the second condition. In a case where the road-surface condition acquired by the road-surface condition acquisition portion belongs to the first condition and the second condition, the brake force control device may control the brake force such that the brake force has an intermediate strength between a strength of the brake force to be applied in the first condition and a strength of the brake force to be applied in the second condition.

In a case where the first condition and the second condition are acquired by the road-surface condition acquisition portion as the road-surface condition, it is possible to control the brake force such that the strength of the brake force is weaker than the strength of the brake force to be applied in the first condition but stronger than the strength of the brake force to be applied in the second condition. For example, it is possible to control the brake force with an average magnitude between the brake force to be applied in the first condition and the brake force to be applied in the second condition.

(4) In the braking system according to (2) or (3), the first condition may be a rocky area, and the second condition may be a sand area or a muddy area.

(5) In the braking system according to any one of (1) to (4), the brake force control device may include a control mode determination portion configured to determine a control mode based on the road-surface condition acquired by the road-surface condition acquisition portion. The brake force control device may control the brake force based on the control mode determined by the control mode determination portion.

(6) In the braking system according to (5), the road-surface condition acquisition portion may be configured to acquire which condition the road-surface condition belongs to, the first condition or the second condition. In a case where the road-surface condition acquired by the road-surface condition acquisition portion belongs to the first condition and the second condition, the control mode determination portion may be configured to determine the control mode to a third control mode that is a control mode different from a first control mode and a second control mode, the first control mode being a control mode corresponding to the first condition, the second control mode being a control mode corresponding to the second condition. In the third control mode, a brake force controlled in the third control mode may have an intermediate magnitude between a magnitude of a brake force controlled in the first control mode and a magnitude of a brake force controlled in the second control mode.

The third control mode corresponds to the MTSoff mode in the above embodiment.

(7) In the braking system according to any one of (1) to (6), the brake force control device may include a traction controlling portion configured to control the brake force such that a skid of the wheel to be caused when the vehicle is driven is restrained.

(8) In the braking system according to any one of (1) to (7), the brake force control device may include a control road-surface condition determination portion configured to determine a control road-surface condition based on the road-surface condition acquired by the road-surface condition acquisition portion. The brake force control device may control the brake force based on the control road-surface condition determined by the control road-surface condition determination portion. In a case where the road-surface condition acquired by the road-surface condition acquisition portion belongs to a plurality of conditions, the control road-surface condition determination portion may determine that the road-surface condition is different from the conditions.

The road-surface condition acquisition portion can be referred to as a temporary road-surface condition acquisition portion, and the road-surface condition acquired by the road-surface condition acquisition portion can be referred to as a temporary road-surface condition. The control road-surface condition is acquired based on the temporary road-surface condition. There is such a case that the temporary road-surface condition is taken as the control road-surface condition. However, in a case where a plurality of temporary road-surface conditions is acquired, a condition different from the temporary road-surface conditions is taken as the control road-surface condition.

(9) In the vehicle braking system according to (8), the road-surface condition acquisition portion may be configured to acquire which condition the road-surface condition belongs to, the first condition or the second condition. In a case where the road-surface condition acquired by the road-surface condition acquisition portion belongs to the first condition and the second condition, the control road-surface condition determination portion may determine that the road-surface condition belongs to a third condition that is an intermediate road-surface condition between the first condition and the second condition.

For example, in a case where the first condition is the rocky area, and the second condition is the muddy area, the third condition can be determined to be an intermediate road-surface condition between the rocky area and the muddy area (e.g., a rocky area with relatively small projections and recesses, a muddy area close to an asphalt road surface). Further, the third condition can be considered to be a normal road-surface condition for which a control based on an off-road road-surface condition is not suitable (a condition close to an asphalt road).

(10) An in-vehicle system includes an in-vehicle device and a control device. The in-vehicle device is provided in a vehicle and configured to control a traveling state of the vehicle, and the control device is configured to control the in-vehicle device. The control device may include a road-surface condition acquisition portion configured to acquire a road-surface condition indicative of a condition of a road surface where the vehicle travels. In a case where the road-surface condition acquisition portion acquires a plurality of road-surface conditions, the control device may control the in-vehicle device in a mode different from respective controls on the in-vehicle device based on the road-surface conditions.

The in-vehicle system in (10) can employ a technical feature described in any of (1) to (9).

A driving device configured to drive a vehicle, or the like corresponds to the in-vehicle device. In the traction control, the driving force can be controlled instead of the control on the brake force or together with the control on the brake force. Further, a suspension device or the like can be employed as the in-vehicle device.

What is claimed is:
1. An in-vehicle system comprising:
a wheel speed sensor configured to detect a traveling speed value of a vehicle and a rotational acceleration value of a wheel of the vehicle;
an acceleration sensor configured to detect an acceleration value of the vehicle;
a driving-transmission-state acquisition device configured to acquire an operational state of a driving-transmission device of the vehicle;
a brake actuator configured to operate a brake of the wheel, and
a control device that is configured to
determine a road-surface condition of a road on which the vehicle is traveling as (i) a rocky area condition in a case where the traveling speed value is below a setting speed and a lateral value of the acceleration value is larger than a setting lateral value, (ii) a sand area condition in a case where a value obtained by subtracting a front-rear value of the acceleration value from an estimated front-rear acceleration value estimated based on the operational state is equal to or more than a setting value, and (iii) a muddy area condition in a case where an amplitude of change in the rotational acceleration value is equal to or more than a setting value, and
perform a traction control based on the road-surface condition to control a brake force, the traction control being performed by
a rock mode in a case where the road-surface condition is determined as only the rocky area condition,
a mud mode in a case where the road-surface condition is determined as the muddy area condition or both the muddy area condition and the sand area condition,
a sand mode in a case where the road-surface condition is determined as only the sand area condition, and
a Multi Terrain Select off mode (MTSoff mode) in a case where the road-surface condition is determined as the rocky area condition and either the muddy area condition or the sand area condition, or determined as the rocky area condition, the muddy area condition and the sand area condition, the MTSoff mode being an intermediate mode between the rock mode and the mud mode or the sand mode.

2. The in-vehicle system according to claim 1, wherein the control device is configured to perform the traction control by the MTSoff mode in a case where the road-surface condition is determined as neither the rocky area condition, the muddy area condition or the sand area condition.

3. The in-vehicle system according to claim 1, further comprising an accelerator operation amount sensor configured to detect an accelerator operation amount, wherein the control device is configured to perform the traction control by the MTSoff mode in a case where the accelerator operation amount is equal to or more than a setting operation amount and the traveling speed value is equal to or less than a setting speed.

* * * * *